United States Patent
Bui et al.

(10) Patent No.: US 7,990,644 B2
(45) Date of Patent: Aug. 2, 2011

(54) APPARATUS AND METHOD TO DECODE LINEAR POSITION INFORMATION ENCODED IN A SEQUENTIAL INFORMATION STORAGE MEDIUM

(75) Inventors: Nhan Xuan Bui, Tucson, AZ (US); Robert Allen Hutchins, III, Tucson, AZ (US); Malanie Jean Sandberg, Tucson, AZ (US); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 12/040,606

(22) Filed: Feb. 29, 2008

(65) Prior Publication Data

US 2009/0219645 A1      Sep. 3, 2009

(51) Int. Cl.
*G11B 5/09* (2006.01)
*G11B 5/584* (2006.01)

(52) U.S. Cl. .................. 360/47; 360/39; 360/77.12

(58) Field of Classification Search .......... None
See application file for complete search history.

(56) References Cited

U.S. PATENT DOCUMENTS

| | | | |
|---|---|---|---|
| 4,642,709 A | 2/1987 | Vinal | |
| 4,772,963 A * | 9/1988 | Van Lahr et al. | 360/47 |
| 6,243,225 B1 * | 6/2001 | Wyman et al. | 360/77.12 |
| 6,791,781 B2 | 9/2004 | Bui et al. | |
| 6,856,484 B2 | 2/2005 | Johnson et al. | |
| 6,906,887 B2 | 6/2005 | Nakao | |
| 7,245,450 B1 | 7/2007 | Cherubini et al. | |
| 7,245,453 B2 | 7/2007 | Koski et al. | |

* cited by examiner

*Primary Examiner* — Daniell L Negrón

(74) *Attorney, Agent, or Firm* — Dale F. Regelman; Quarles & Brady LLP

(57) ABSTRACT

A method to decode linear position ("LPOS") information encoded in a sequential information storage medium, by detecting each of one or a plurality of sequential first LPOS servo patterns encoded in a first servo band using a first servo sensor in communication with a first servo channel. While detecting that one or a plurality of first LPOS servo patterns, the method fails to detect (n) second LPOS servo patterns encoded in a second servo band. The method determines a value for (n), and then syncs the first servo channel with the second servo channel using that value of (n).

22 Claims, 20 Drawing Sheets

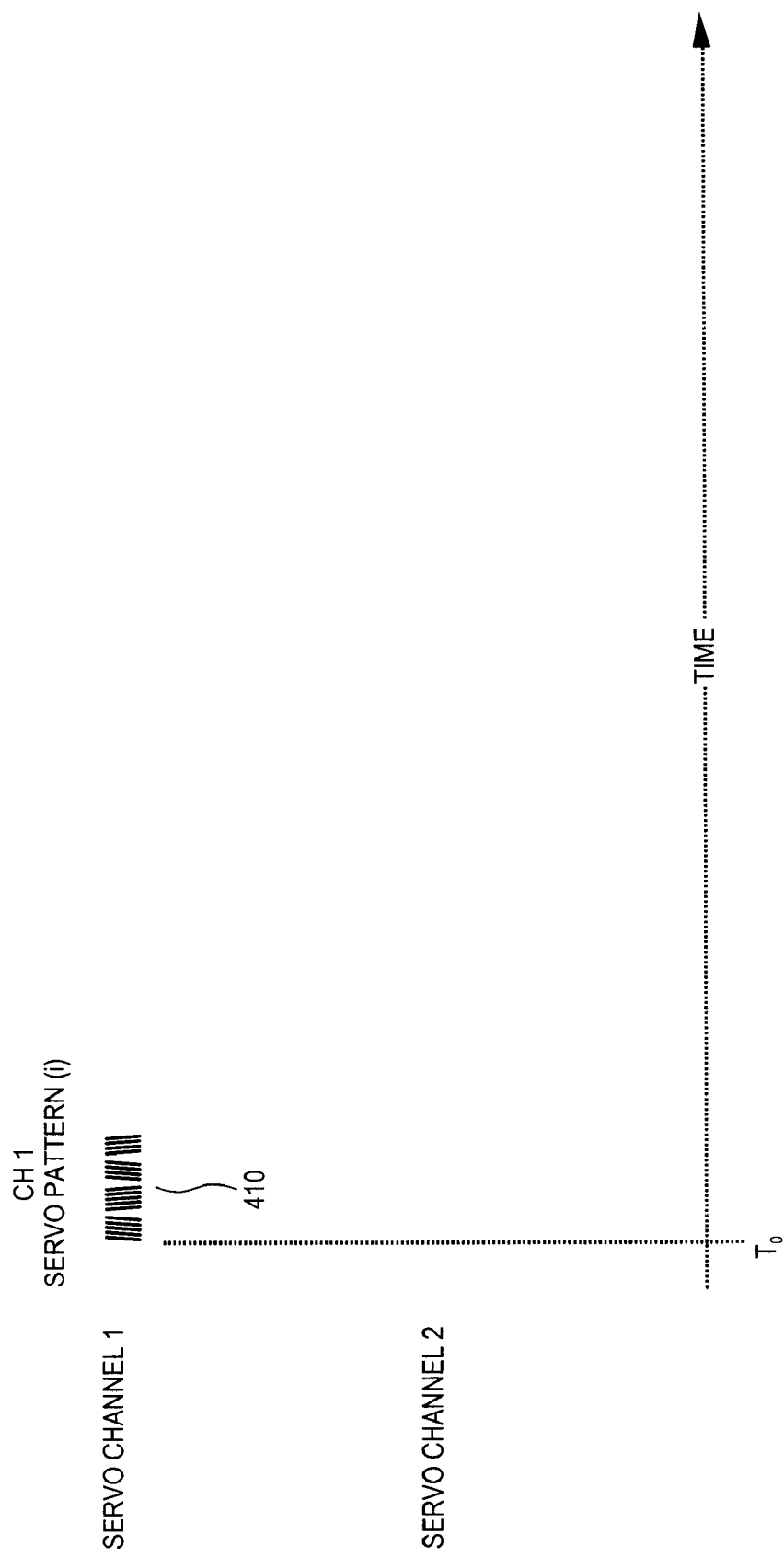

FIG. 4B
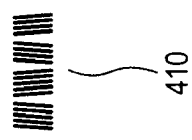
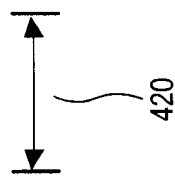
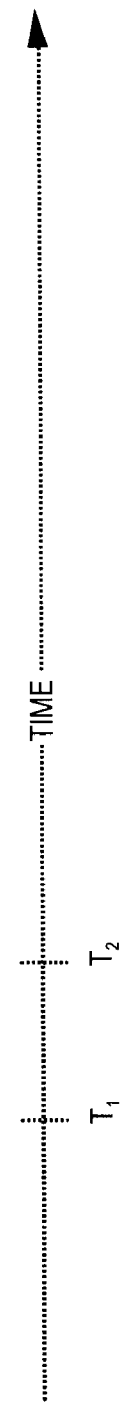

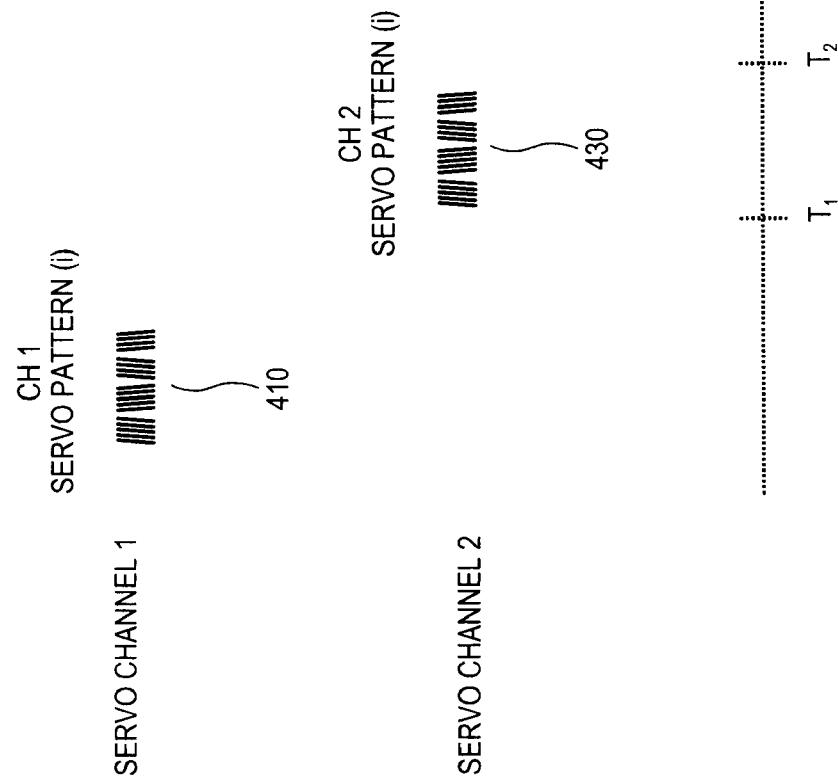

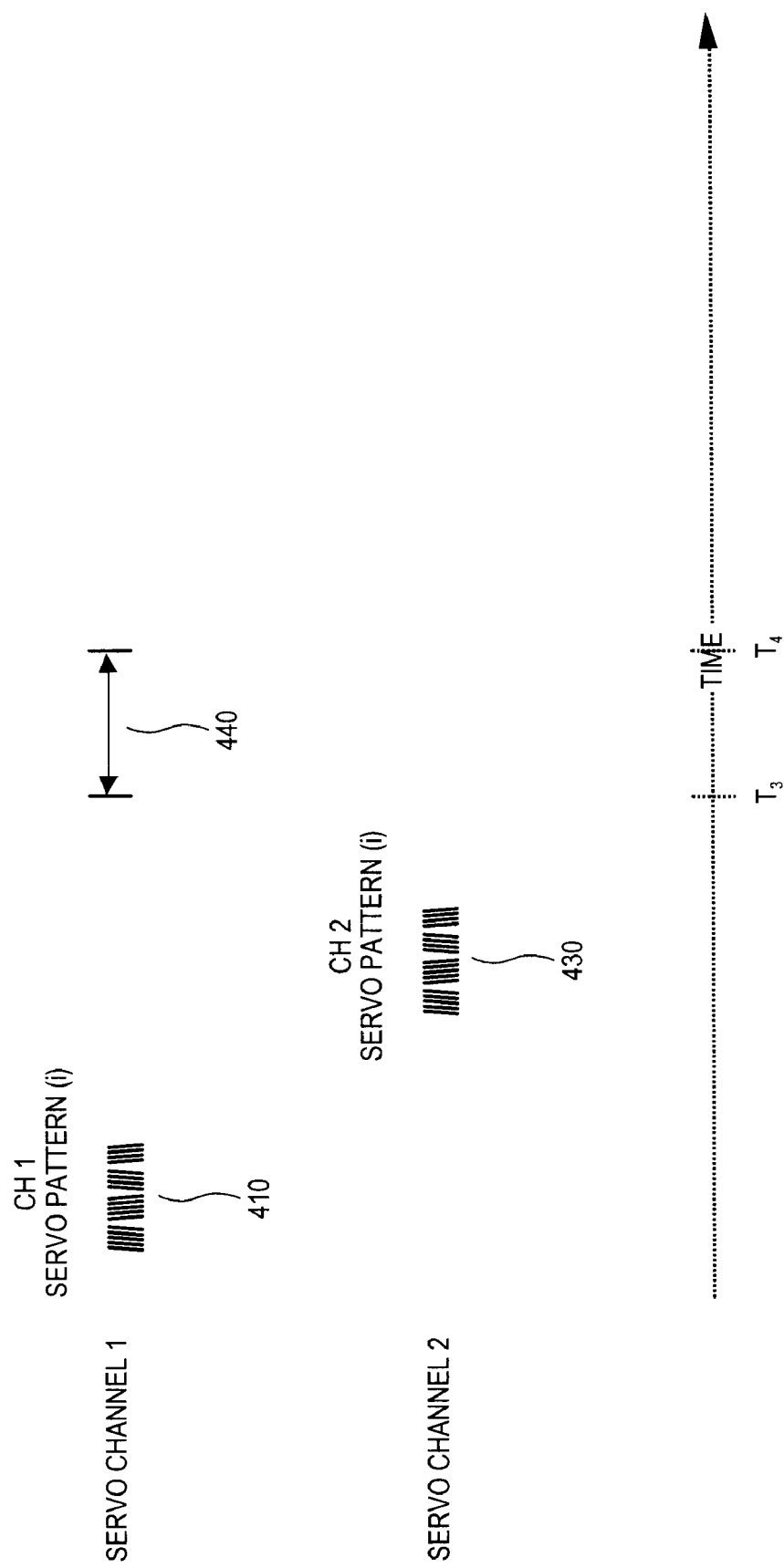

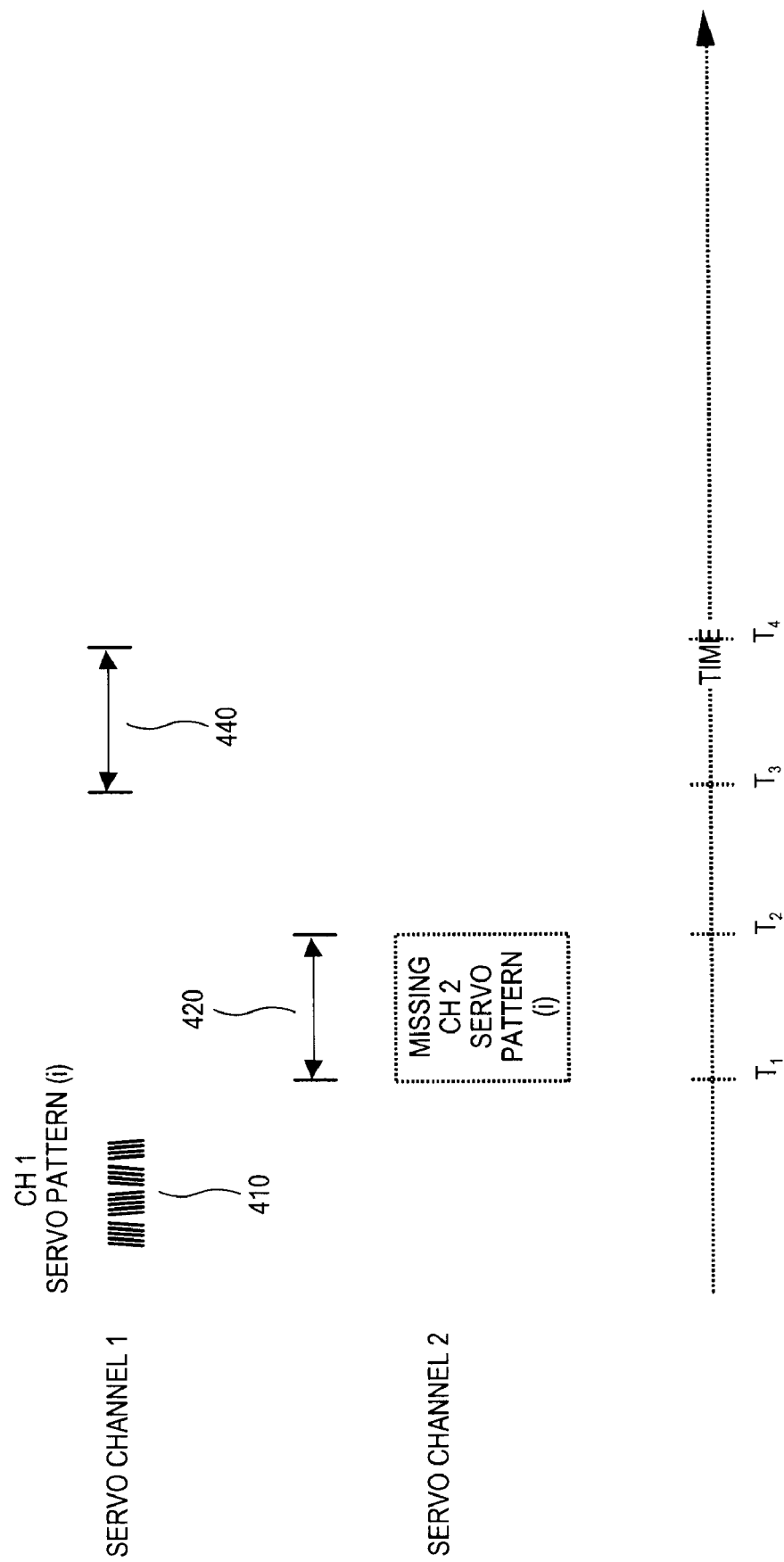

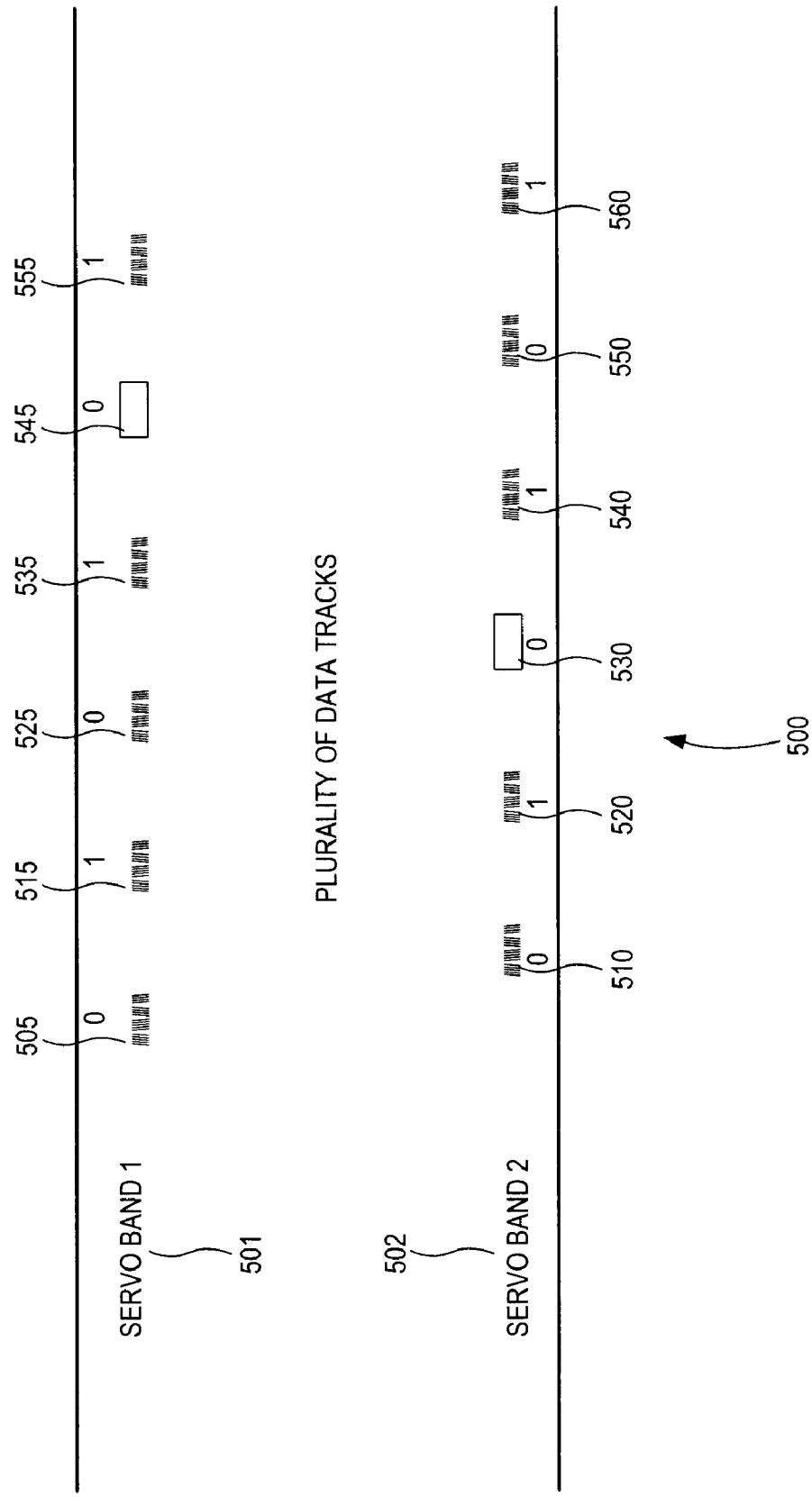

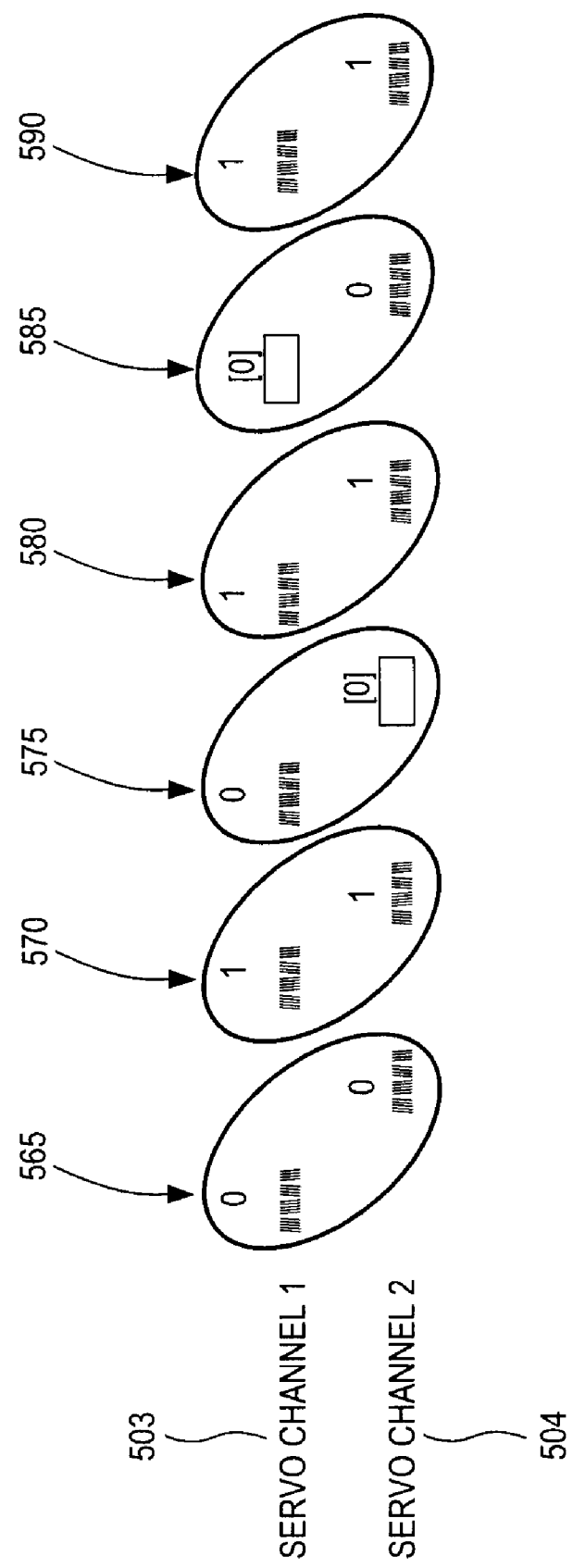

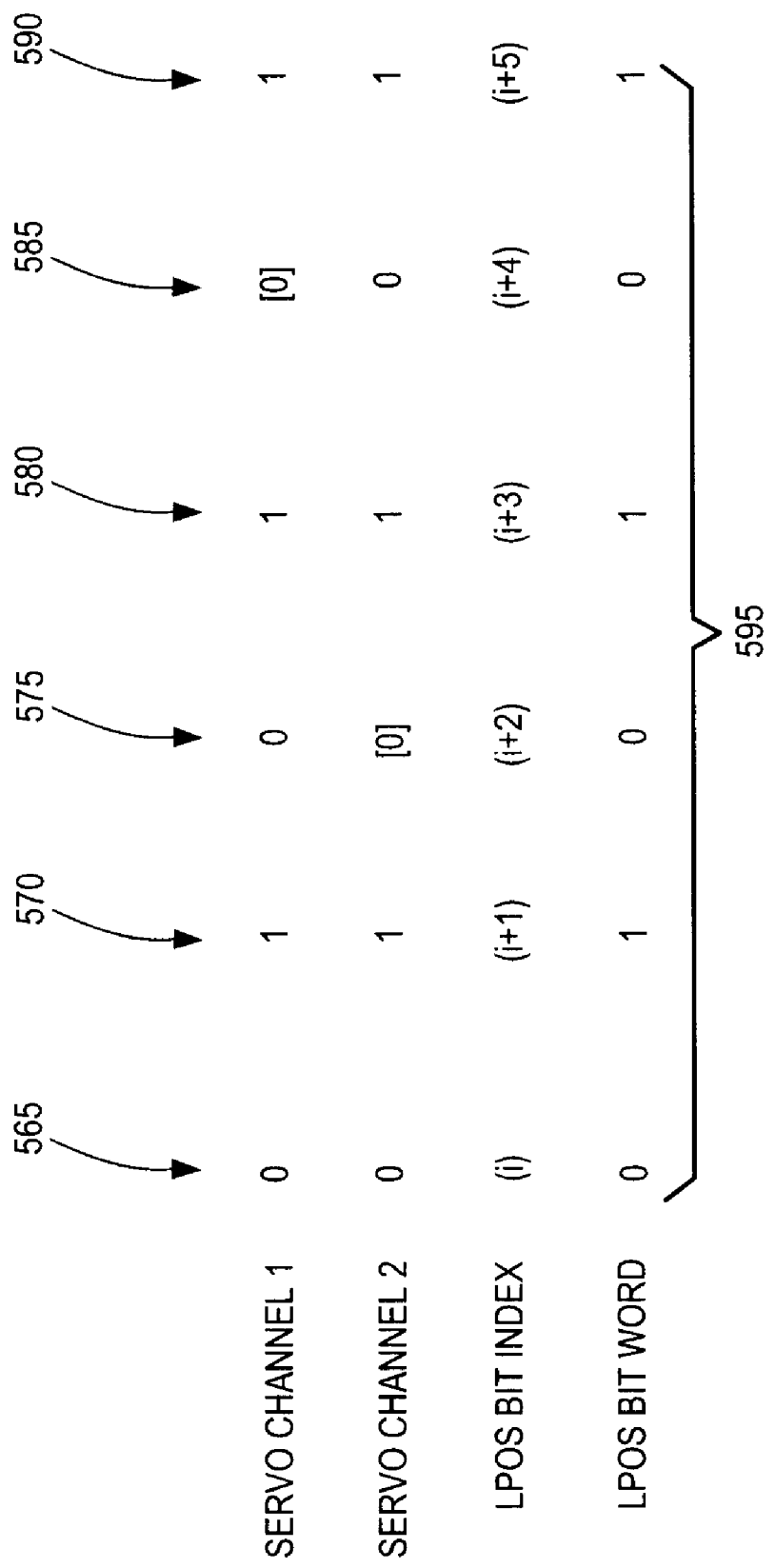

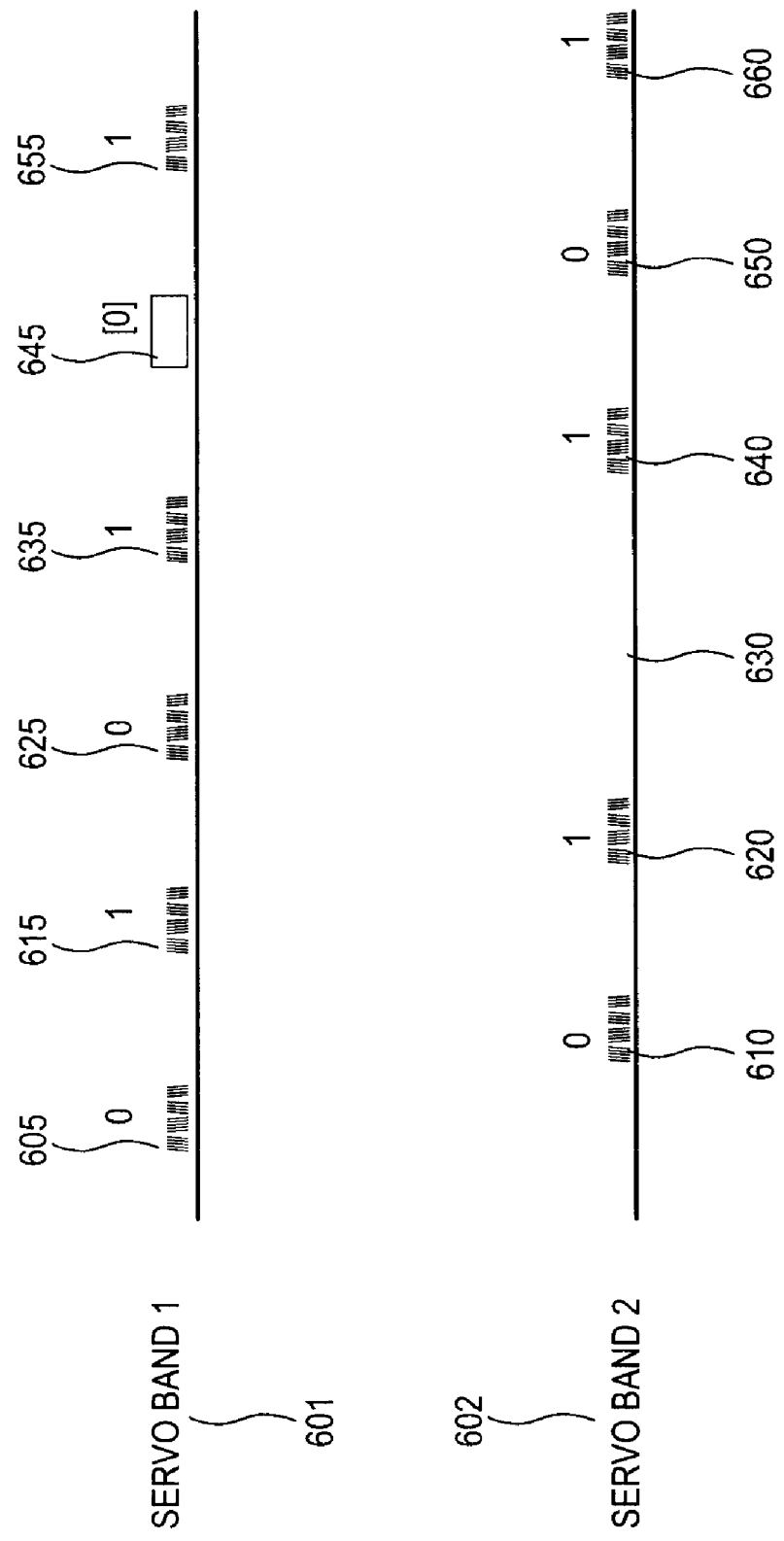

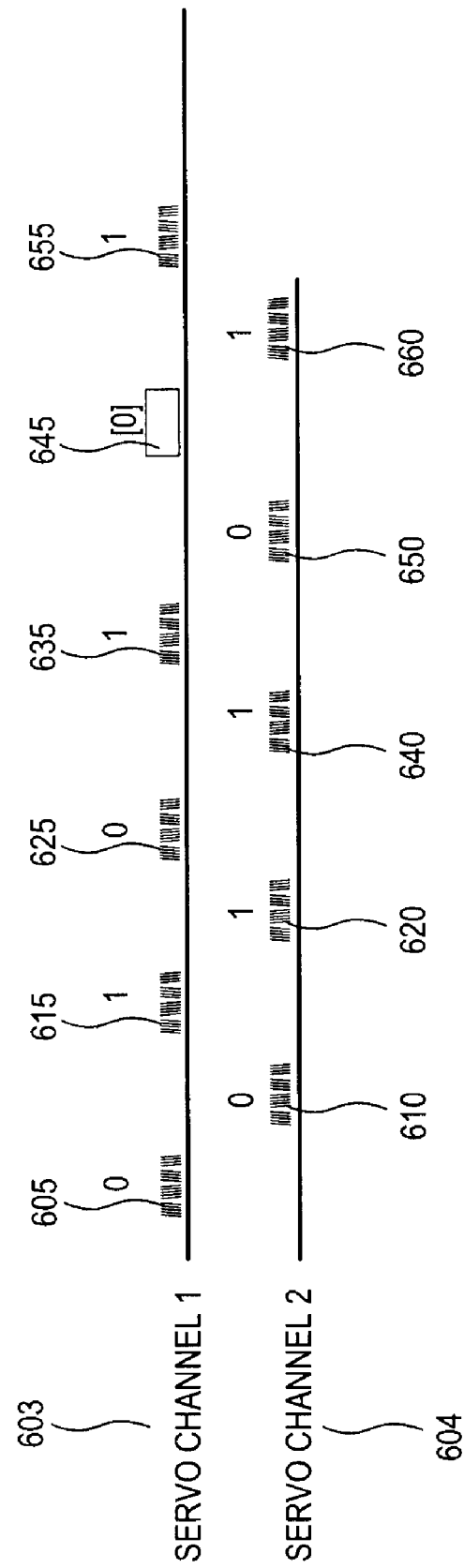

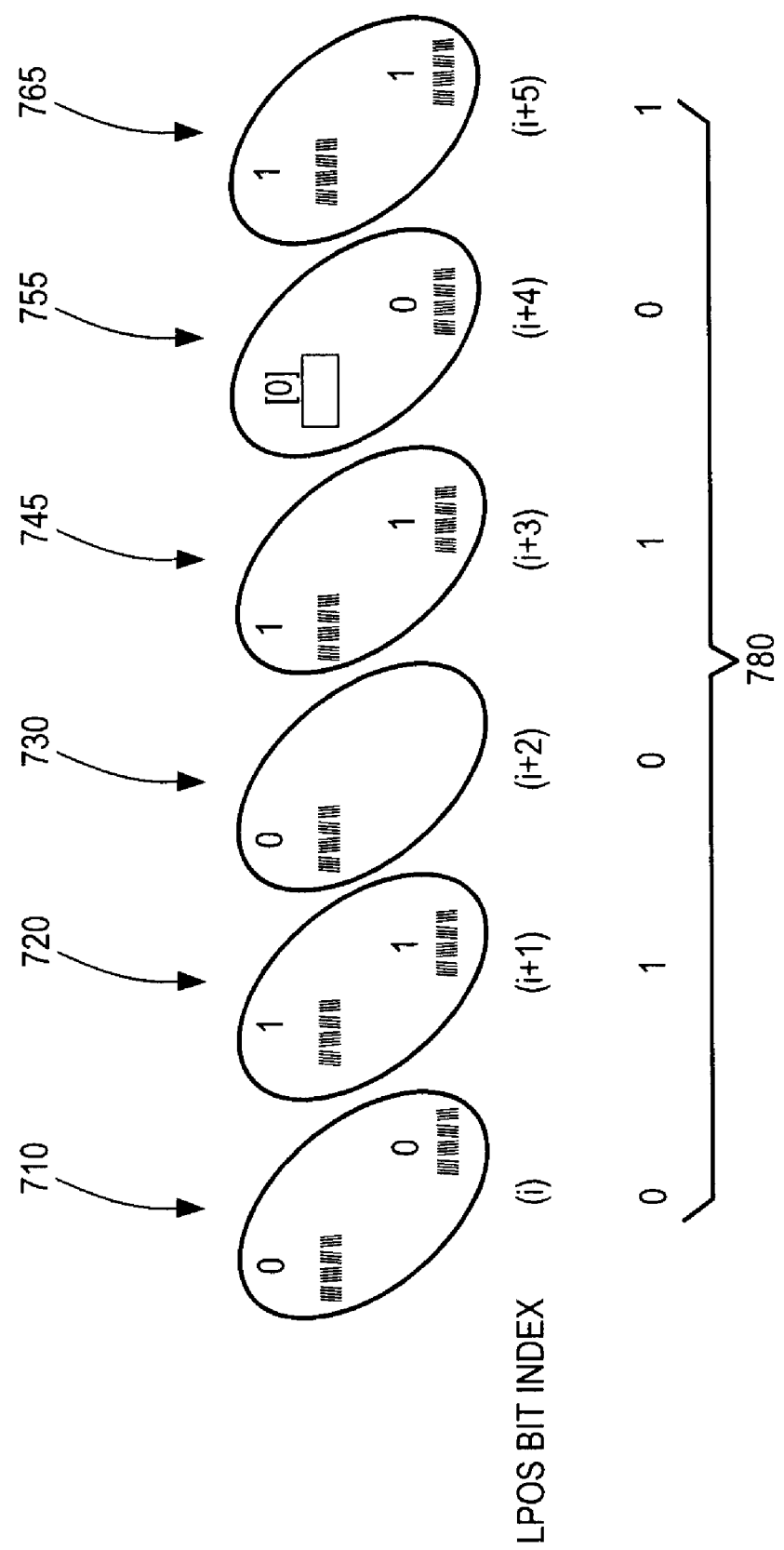

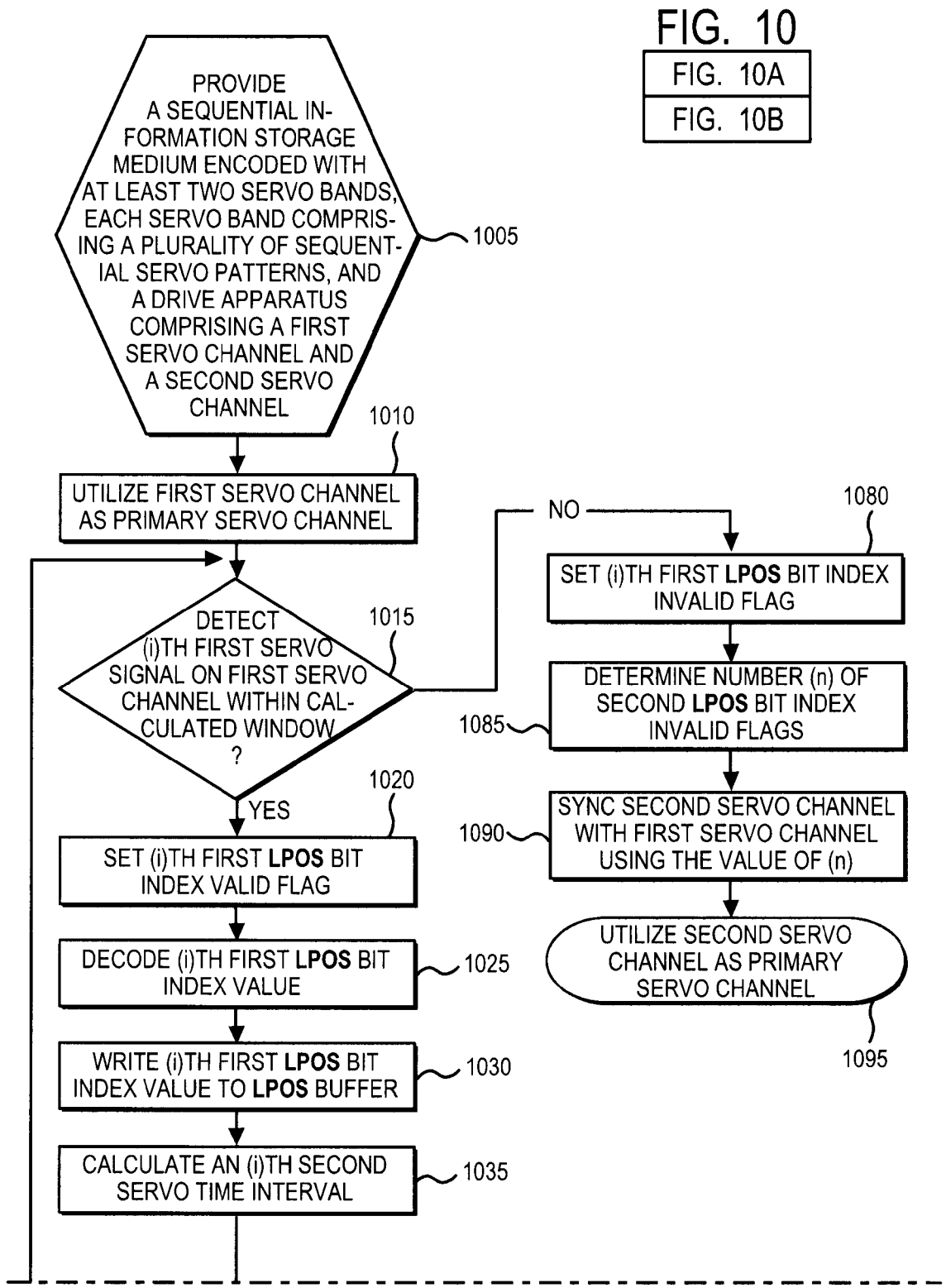

APPARATUS AND METHOD TO DECODE LINEAR POSITION INFORMATION ENCODED IN A SEQUENTIAL INFORMATION STORAGE MEDIUM

FIELD OF THE INVENTION

Applicants' invention relates to an apparatus and method to decode LPOS information encoded in a sequential information storage medium.

BACKGROUND OF THE INVENTION

It is known in the art to encode by pulse position modulation an LPOS word comprising 36 bits of information in a non-data region of a sequential data storage medium, such as a magnetic tape. Each encoded LPOS word relates to a specific absolute longitudinal address, and appears every 7.2 mm down the tape. Using prior art methods, an LPOS word comprises 36 individual servo patterns, i.e. frames, wherein each frame encodes one bit of information. The LPOS values of two consecutive LPOS words differ by one. Therefore, a tape drive can position a data/servo head assembly at a specified LPOS address thereby achieving a longitudinal resolution of about 7.2 mm.

A read/write assembly comprising two servo heads spans a data band and two servo bands disposed adjacent that data band. In the event one servo head is rendered inoperative, then only one servo head can be used to laterally position the read/write head. Alternatively, a servo band may become damaged, or may not comprise useful information resulting from media damage.

SUMMARY OF THE INVENTION

Applicants' invention comprises an apparatus and method to decode linear position ("LPOS") information encoded in a sequential information storage medium. The method detects each of one or a plurality of sequential first LPOS servo patterns encoded in a first servo band using a first servo sensor in communication with a first servo channel. While detecting that one or a plurality of first LPOS servo patterns, Applicants' apparatus and method may not detect (n) second LPOS servo patterns encoded in a second servo band using a second servo sensor in communication with a second servo channel, wherein (n) is greater than or equal to 1.

In response to not detecting a first LPOS servo pattern encoded in said first servo band using said first servo sensor, the method determines a value for (n) which represents the number of missed second servo patterns. The method then syncs the first servo channel with the second servo channel using the value of (n). Thereafter, the method detects each of one or a plurality of sequential second LPOS servo patterns encoded in the second servo band using the second servo sensor.

BRIEF DESCRIPTION OF THE DRAWINGS

The invention will be better understood from a reading of the following detailed description taken in conjunction with the drawings in which like reference designators are used to designate like elements, and in which:

FIG. 4A illustrates one step of Applicants' method to decode LPOS information encoded in a sequential information storage medium;

FIG. 4B illustrates a second step of Applicants' method to decode LPOS information encoded in a sequential information storage medium;

FIG. 4C illustrates a third step of Applicants' method to decode LPOS information encoded in a sequential information storage medium;

FIG. 4D illustrates one embodiment of a fourth step of Applicants' method to decode LPOS information encoded in a sequential information storage medium;

FIG. 4E illustrates a second embodiment of the fourth step of Applicants' method to decode LPOS information encoded in a sequential information storage medium;

FIG. 5A illustrates an embodiment of Applicants' sequential information storage medium comprising two servo bands;

FIG. 5B illustrates groupings of servo patterns encoded in the first servo band and in the second servo band;

FIG. 5C illustrates a prior art method to decode LPOS information;

FIG. 6A illustrates servo patterns encoded in two different servo bands, wherein one servo band is missing a servo pattern;

FIG. 6B illustrates a "timing error" that results from using the prior art method of FIG. 5C;

FIG. 7B illustrates formation of a correct LPOS word using Applicants' method;

FIG. 10A summarizes certain additional steps of Applicants' method to decode LPOS information encoded in a sequential information storage medium.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In sequential data storage media, such as for example magnetic tape storage media, servo patterns are encoded in non-data portions of the medium. Those servo patterns are used to position a read/write head with respect to a plurality of data tracks, to provide sync data, to provide manufacturer data, and to determine linear position ("LPOS") along the length of the medium.

Figure 1:
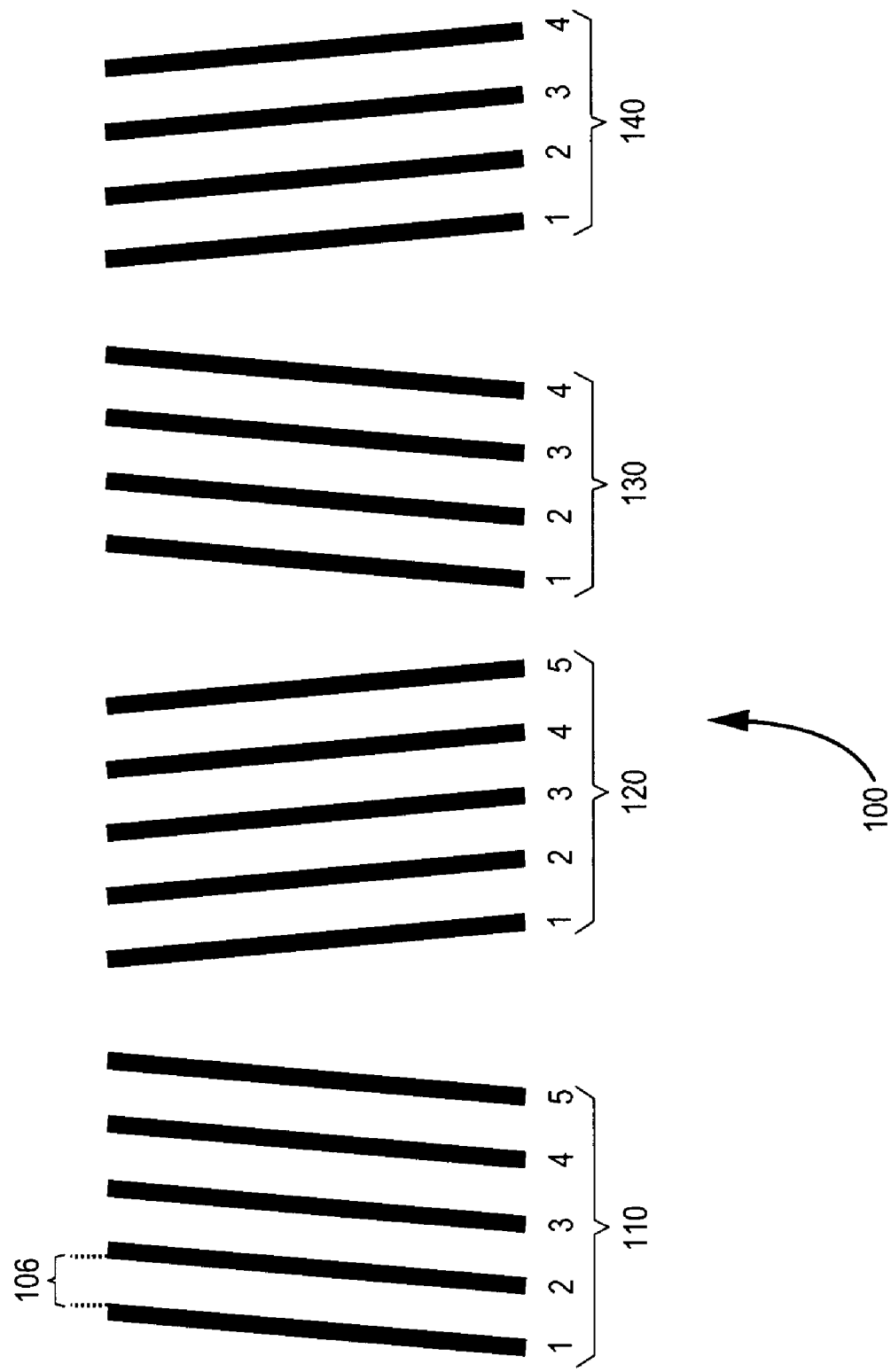
FIG. 1 illustrates a servo pattern comprising four bursts, wherein each of those four bursts comprises a plurality of pulses.

Referring to FIG. 1, recorded servo pattern 100 consists of transitions with two different azimuthal slopes. Read/write head position is derived from the relative timing of pulses generated by a narrow head reading the pattern. Servo pattern 100 also allows the encoding of LPOS information without affecting the generation of the transversal position error signal ("PES").

LPOS information is encoded by shifting transitions from the nominal pattern positions shown in FIG. 1. In tape systems there are typically available two dedicated servo channels from which LPOS information as well as PES can be derived.

Servo pattern 100 comprises a first burst 110 comprising five pulses, wherein each of those five pulses comprises a first azimuthal slope and wherein each of the five pulses in burst 120 is separated from neighboring pulses by a nominal spacing. Servo pattern 100 further comprises a second burst 120 comprising five pulses, wherein each of those five pulses comprises a second azimuthal slope, and wherein each of the five pulses in burst 120 is separated from neighboring pulses by a nominal spacing.

Servo pattern 100 further comprises a third burst 130 comprising four pulses, wherein each of those four pulses comprises the first azimuthal slope, and wherein each of the four pulses in burst 130 is separated from neighboring pulses by a nominal spacing. Servo pattern 100 further comprises a fourth burst 140 comprising four pulses, wherein each of those four pulses comprises the second azimuthal slope, and wherein each of the four pulses in burst 140 is separated from neighboring pulses by a nominal spacing.

Because all of the pulses disposed in servo pattern 100 are separated from neighboring pulses by the same nominal spacing 106, servo pattern 100 does not encode any LPOS information. Prior art methods adjust the spacings between pulses in burst 110 and in burst 120 to encode LPOS data. Using these prior art servo patterns and methods, the spacings between neighboring pulses in bursts 130 and 140 remain set at the nominal spacing 106. As a result, prior art servo patterns and methods do not encode data in bursts 130 and 140.

Figure 2:
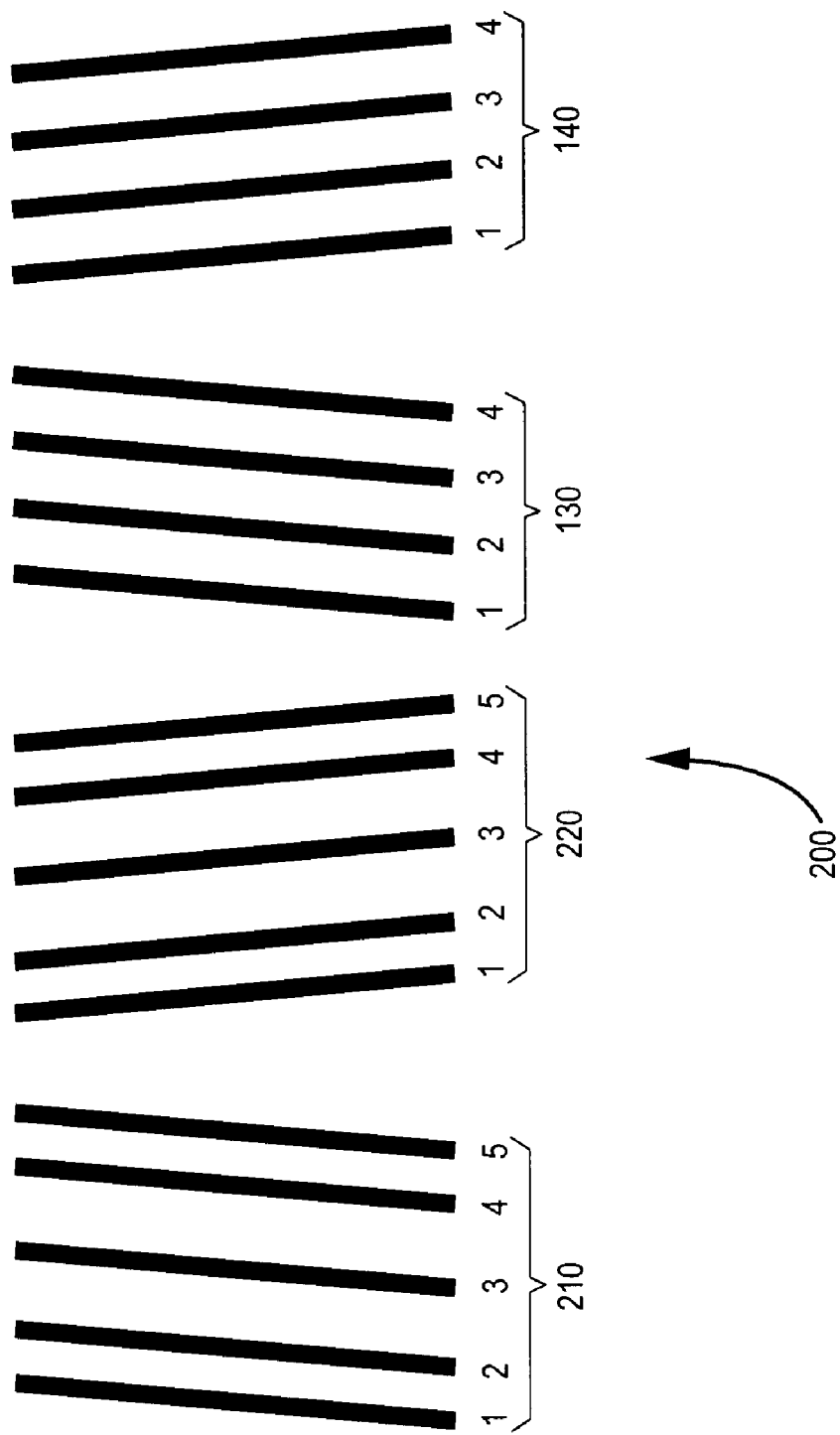
FIG. 2 illustrates a first prior art servo pattern used to encode a single bit of information.

FIG. 2 shows prior art servo pattern 200. The spacings between the pulses in bursts 210 and 220 have been altered with respect to the nominal spacing 106 (FIG. 1). Using prior art methods, servo pattern 200 encodes a bit of information, wherein that bit is decoded to comprise a value of "1".

Figure 3:
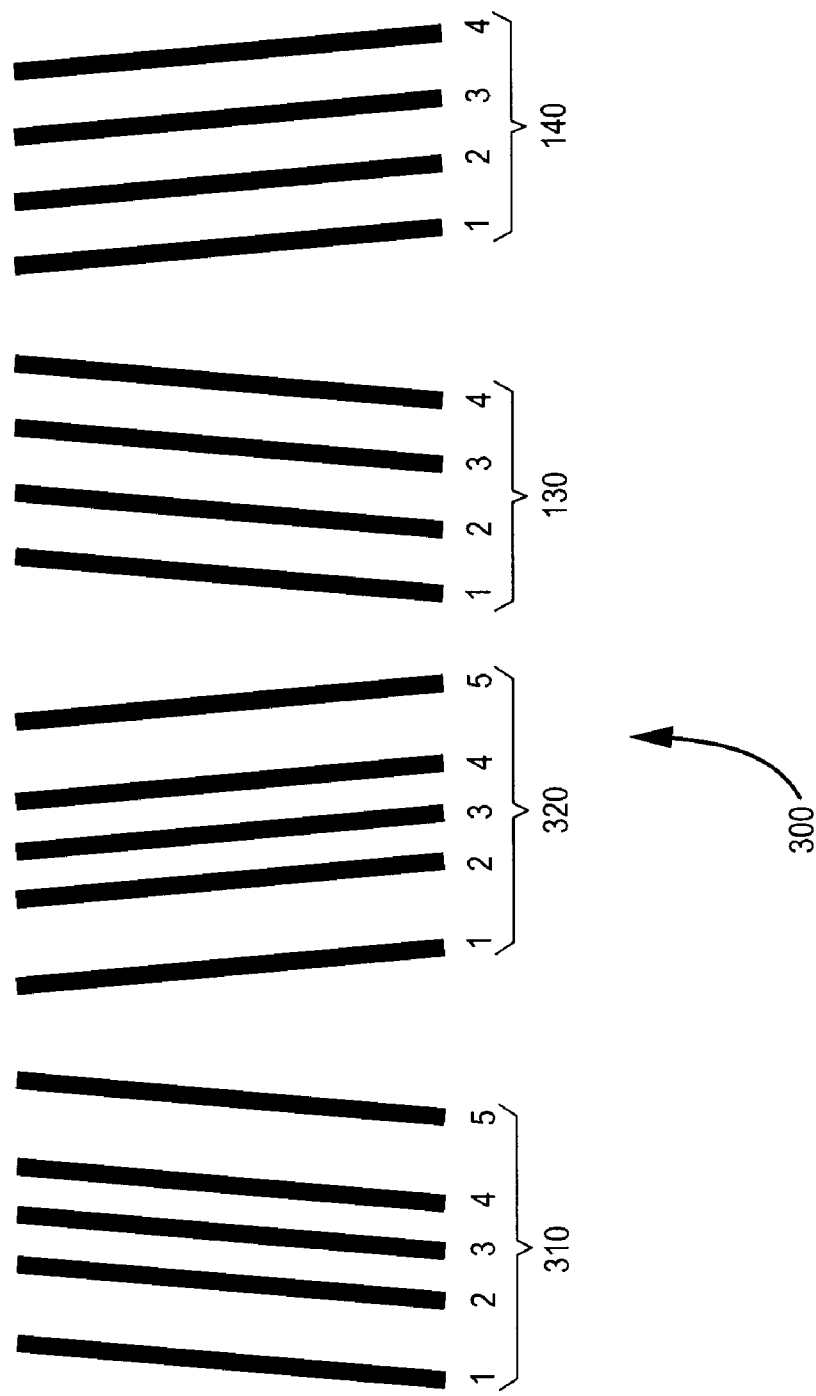
FIG. 3 illustrates a second prior art servo pattern used to encode a single bit of information.

FIG. 3 shows prior art servo pattern 300. The spacings between the pulses in bursts 310 and 320 have been altered with respect to the nominal spacing 106 (FIG. 1). Using prior art methods, servo pattern 300 encodes a bit of information, wherein that bit is decoded to comprise a value of "0".

Referring now to FIG. 5A, sequential information storage medium 500 comprises a first Servo Band 501 encoded therein and a second Servo band 502 encoded therein, wherein first Servo Band 501 is disposed on one side of a plurality of data tracks and second Servo band 502 is disposed on a second, and opposing, side of that plurality of data tracks. In certain embodiments, sequential information storage medium 500 comprises a magnetic tape. As those skilled in the art will appreciate, magnetic tape 500 comprises other feature which, for the sake of clarity, are not shown in FIG. 5A. For example and without limitation, in certain embodiments magnetic tape 500 comprises a plurality of sets of data tracks, wherein each set of data tracks is disposed between two servo bands.

Figure 8:
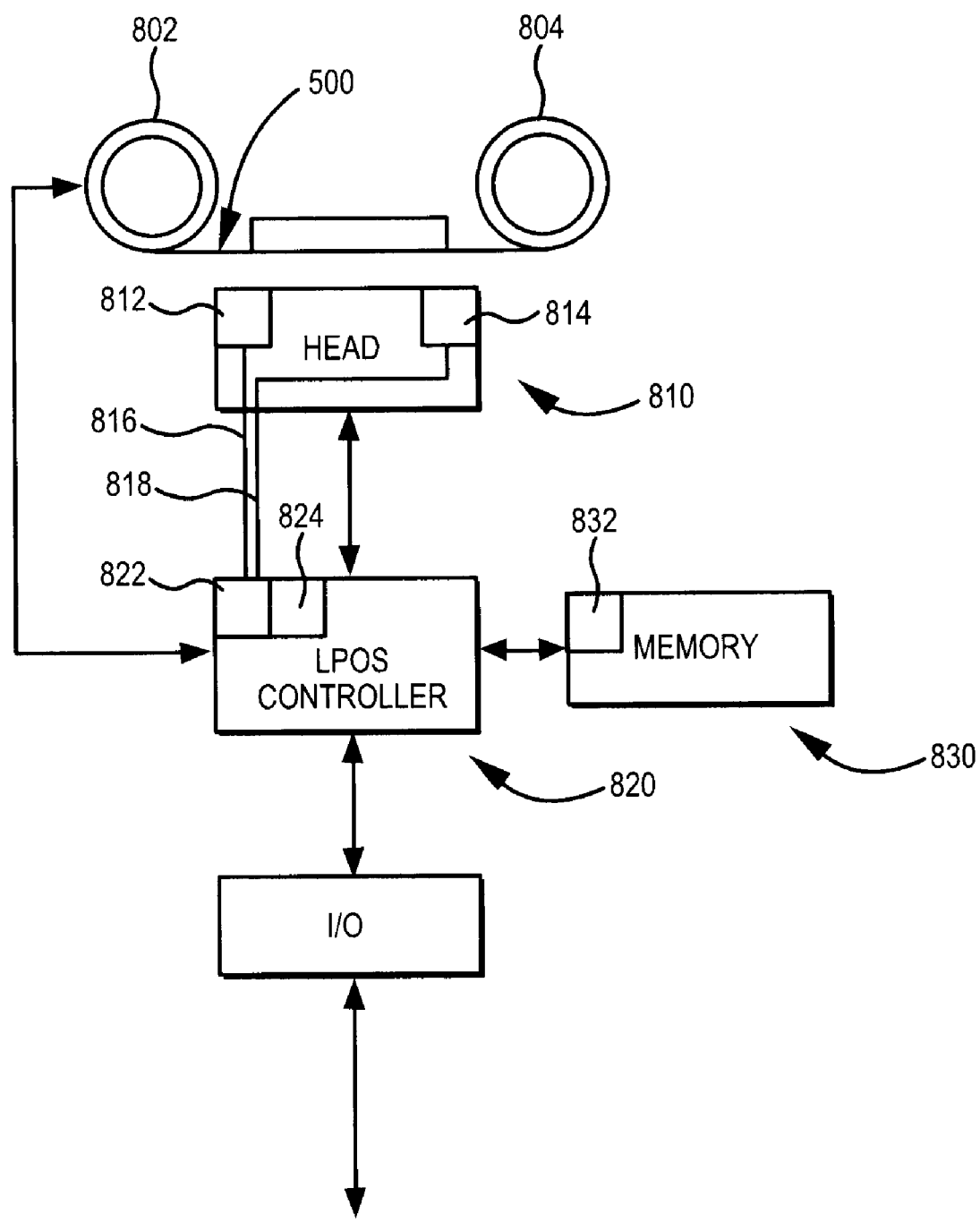
FIG. 8 illustrates Applicants' LPOS controller.

In the illustrated embodiment of FIG. 8, sequential information storage medium 500 is disposed partially on tape reel 802 and partially on tape reel 804. As medium 500 is moved between reels 802 and 804, that information storage medium passes by read/write head 810. In the illustrated embodiment of FIG. 8, read/write head 810 comprises first servo sensor 812 and second servo sensor 814. As those skilled in the art will appreciate, read/write head 810 may comprises additional features, components, and elements not shown in FIG. 8.

Servo sensors 812 and 814 are positioned on read/write head 810, and read/write head 810 is positioned such that either servo sensor 812 or 814 can detect the first servo band 501 (FIG. 5A) written to sequential information storage medium 500, and such that the other servo sensor can detect the second servo band 502 (FIG. 5A). Signals detected by first servo sensor 812 are provided to LPOS controller 820 by first servo channel 816. Signals detected by second servo sensor 814 are provided to LPOS controller 820 by second servo channel 818.

In the illustrated embodiment of FIG. 8, LPOS controller 820 comprises processor 822 and LPOS buffer 824. LPOS controller 820 is in communication with computer readable medium 830. In the illustrated embodiment of FIG. 8, computer readable program code 832 comprises a series of computer readable program steps to implement one or more of the steps of Applicants' method recited in FIGS. 9 and/or 10, wherein that computer readable code is encoded in computer readable medium 830.

Referring once again to FIG. 5A, first servo band 501 comprises servo patterns 505, 515, 525, 535, 545, and 555, wherein those servo patterns encode bits 0, 1, 0, 1, 0, and 1, respectively. Further in the illustrated embodiment of FIG. 5A, second servo band 502 comprises servo patterns 510, 520, 530, 540, 550 and 560, wherein those servo patterns encode bits 0, 1, 0, 1, 0, and 1, respectively.

Servo pattern 530 is shown corrupted in FIG. 5A such that the encoded bit "0" cannot be read. Servo pattern 545 is shown corrupted in FIG. 5A such that the encoded bit "0" cannot be read.

Referring now to FIGS. 5A and 5B, the servo patterns disposed in first servo band 501 and second servo band 502 are shown grouped in pairs in FIG. 5B. Servo patterns 505 and 510 comprise grouping 565, wherein both servo patterns encode a "0". Servo patterns 515 and 520 comprise grouping 570, wherein both servo patterns encode a "1". Servo patterns 525 and 530 comprise grouping 575, wherein both servo patterns encode a "0". Servo patterns 535 and 540 comprise grouping 580, wherein both servo patterns encode a "1". Servo patterns 545 and 550 comprise grouping 585, wherein both servo patterns encode a "0". Servo patterns 555 and 560 comprise grouping 590, wherein both servo patterns encode a "1".

Prior art methods to decode LPOS information from a plurality of servo patterns encoded in a sequential information storage medium utilize a valid bit from a first servo channel at each bit index, unless at a particular bit index that first servo channel bit is invalid wherein the prior art substitutes at that bit index a corresponding valid bit received from a second servo channel. For example and referring now to FIGS. 5B and 5C, prior art methods set an (i)th LPOS bit index value by selecting a valid bit from servo channel 1, an (i+1)th LPOS bit index by selecting a valid bit from servo channel 1, an (i+2)th LPOS bit index value by substituting a valid bit from servo channel 1, an (i+3)th LPOS bit index value by selecting a valid bit from servo channel 1, an (i+4)th LPOS bit index value by substituting a valid bit from servo channel 2 for an invalid bit received from servo channel 1, and an (i+5)th LPOS bit index value by selecting a valid bit servo channel 1.

The prior art method illustrated in FIGS. 5A, 5B, and 5C, and described hereinabove cannot, however, accommodate certain "timing" errors that arise when a servo pattern is completely missed. For example and referring now to FIG. 6A, first servo band 601 comprises servo patterns 605, 615, 625, 635, 645, and 655, wherein those servo patterns encode bits 0, 1, 0, 1, 0, and 1, respectively. Servo pattern 645 is shown corrupted such that its encoded 0 cannot be read.

Further in the illustrated embodiment of FIG. 6A, second servo band 602 comprises servo patterns 610, 620, 640, 650, and 660, wherein those servo patterns encode bits 0, 1, 1, 0, and 1, respectively. Servo pattern 630 is not shown in FIG. 6A because that servo pattern was not detected by a servo sensor. As those skilled in the art will appreciate, such detection failures can arise from media defects, signal fading, and the like.

The signals received by LPOS controller 820 (FIG. 8) in a first servo channel 603 (FIG. 6B), i.e. the signals detected from first servo band 601, and the signals received by controller 820 in a second servo channel 604 (FIG. 6B), i.e. the signals detected from second servo band 602, are shown in FIG. 6B. Because servo pattern 630 (FIG. 6A) was not detected, second servo channel 604 provides a detected signal for servo pattern 640 directly in sequence after a detected signal for servo pattern 620.

Figure 7A:
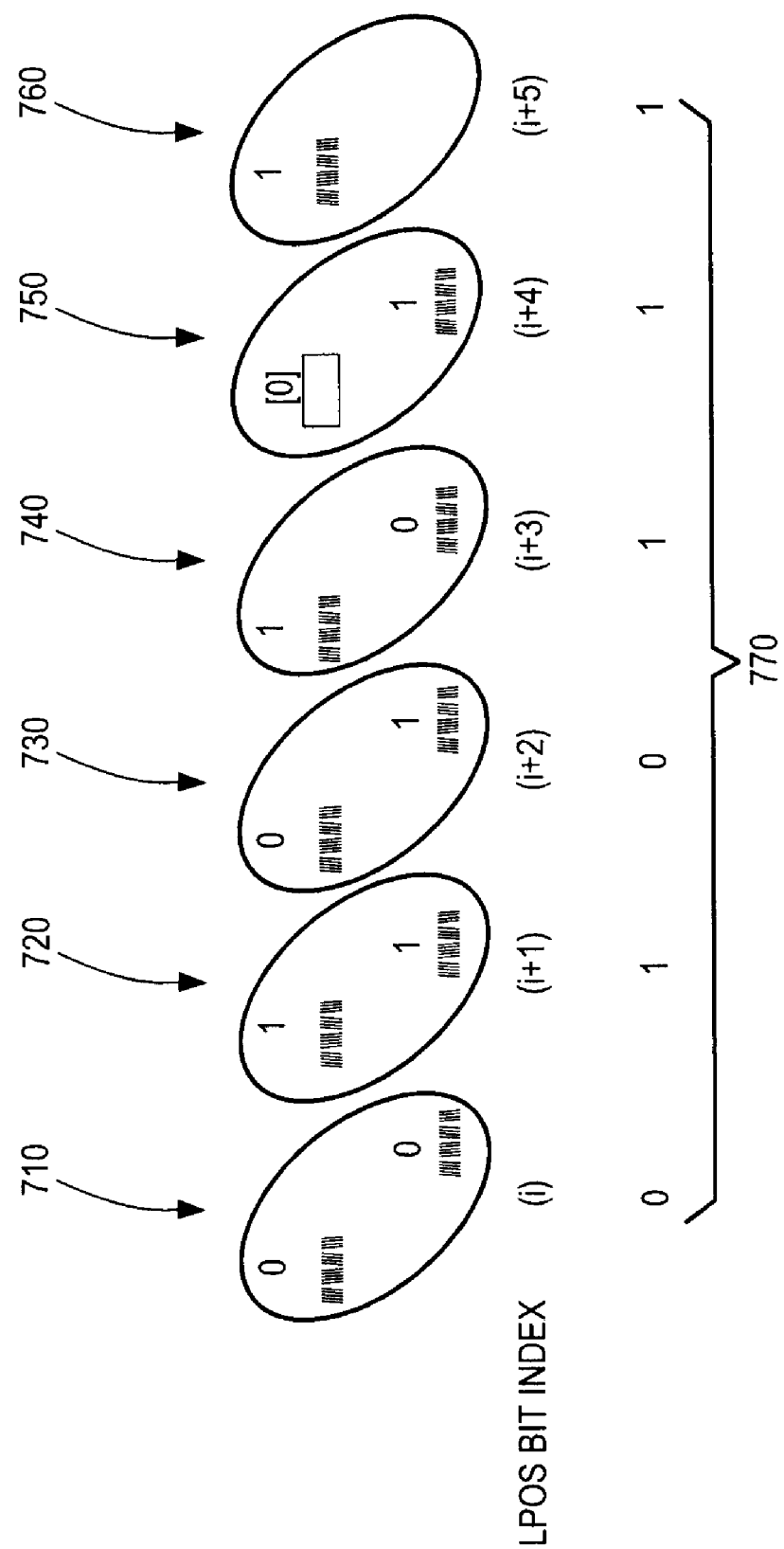
FIG. 7A illustrates formation of an incorrect LPOS word using the prior art method of FIG. 5C.

Referring now to FIG. 7A, using the prior art LPOS decoding method described hereinabove, groupings 710 and 720 properly comprise detected and decoded signals from corresponding servo patterns. Because servo pattern 630 was not detected, grouping 730 comprises detected and decoded signals for servo patterns 625 and 640, rather than the properly-corresponding servo patterns 625 and 630. Similarly, groupings 740, 750, and 760, comprise misaligned LPOS bit indices.

Using prior art methods to generate LPOS information, detected and decoded bits from servo channel 1 are initially used. If servo channel 1 detects a corrupted servo pattern for a certain LPOS bit index, then the prior method substitutes the corresponding detected and decoded bit from servo channel 2.

Using the servo signal groupings of FIG. 7, because servo channel 1 detects a corrupted servo pattern 645, prior art methods substitute the detected and decoded "paired" bit from servo channel 2. Therefore, prior art methods would substitute the detected and decoded bit from servo channel 2 in the grouping 750. However, due to the timing error generated by missing servo pattern 630, the decoded servo signals of grouping 750 actually comprises misaligned LPOS bit indices.

Grouping 750 comprises the invalid signal for LPOS bit index (i+4) received from servo channel 1 and the detected and decoded signal for LPOS bit index (i+5) received from servo channel 2. This being the case, prior art methods place at LPOS bit index (i+4) a value of 1 rather than the proper value 0. Therefore, prior art methods incorrectly decode the LPOS signals from servo patterns 605, 610, 615, 620, 625, 630, 635, 640, 645, 650, 655, and 660, to generate LPOS word 770 comprising bits 010111. The intended LPOS word comprises bits 010101.

Figure 9:
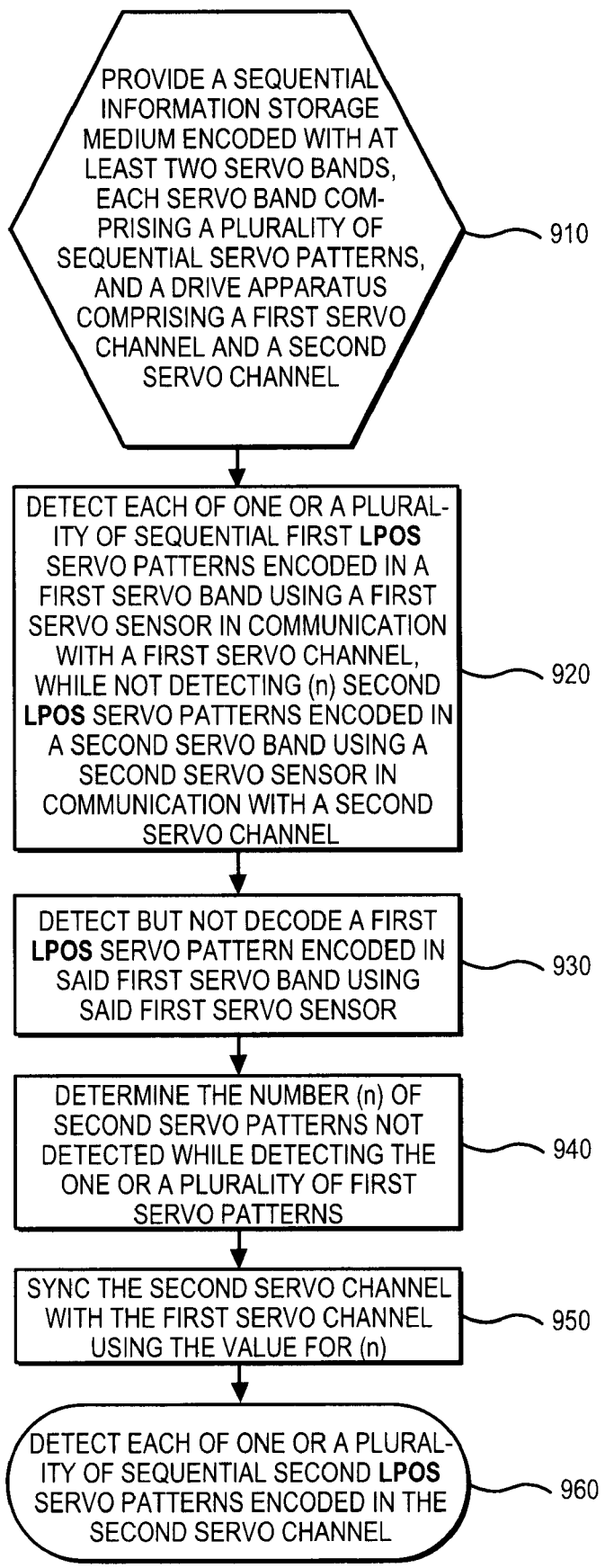
FIG. 9 summarizes the steps of Applicants' method to decode LPOS information encoded in a sequential information storage medium.

Applicants' method to decode LPOS information encoded in a sequential information storage medium cures the "timing error" limitations of the prior art. FIG. 9 summarizes the steps of Applicants' method. Referring now to FIG. 9, in step 910 the method provides a sequential information storage medium, such as a magnetic tape, encoded with at least two servo bands, wherein each servo band comprises a plurality of sequential servo patterns, wherein each servo pattern encodes a bit of LPOS information. Step 910 further comprises supplying a drive apparatus, such as a tape drive apparatus, comprising a first servo channel comprising a first servo sensor, a second servo channel comprising a second servo sensor, an LPOS controller, and an LPOS buffer.

In step 920, the method detects each of one or a plurality of sequential first LPOS servo patterns encoded in a first servo band. In certain embodiments, the detecting portion of step 920 is performed by Applicants' LPOS controller. In certain embodiments, the detecting portion of step 920 is performed by a tape drive assembly. Further in step 920, while detecting the one or more first LPOS servo patterns the read head fails to detect (n) second LPOS servo patterns encoded in a second servo band using a second servo channel.

In step 930, the method detects a corrupted first LPOS servo signal encoded in the first servo band. In step 940, in response to failing to decode a first LPOS servo signal, the method determines the number (n) of second servo patterns not detected while detecting the one or more first servo patterns in step 920. In certain embodiments, step 940 is performed by Applicants' LPOS controller. In certain embodiments, step 940 is performed by a tape drive assembly.

In step 950, the method syncs the second servo channel with the first servo channel using the value of (n) determined in step 930. In certain embodiments, step 950 is performed by Applicants' LPOS controller. In certain embodiments, step 950 is performed by a tape drive assembly.

In step 960, the method detects and decodes each of one or a plurality of second LPOS servo signals encoded in the second servo band. In certain embodiments, step 960 is performed by Applicants' LPOS controller. In certain embodiments, step 960 is performed by a tape drive assembly.

For example and referring once again to FIGS. 6A and 6B, using Applicants' method of FIG. 9, in step 920 the method would detect servo patterns 605, 615, 625, and 635 encoded in servo band 601, but not detect servo pattern 630 from servo band 602. In step 930, the method detects but cannot decode LPOS servo pattern 645. In step 940, based upon missing servo signal 630 the method sets (n) to 1, and syncs servo band 602 with servo band 601 using that value of 1 for (n).

Figure 6C:
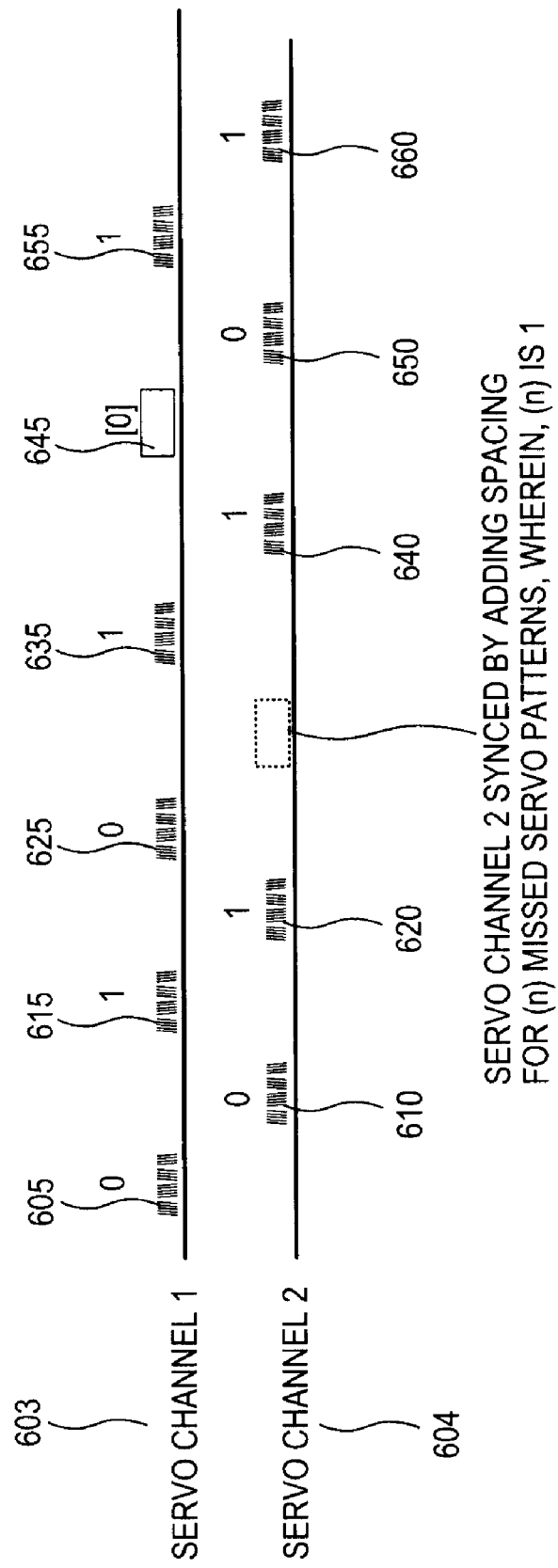
FIG. 6C illustrates use of Applicants' method to eliminate the timing error of FIG. 6B.

Referring to FIGS. 6B and 6C, Applicants' method in step 950 syncs servo channel 603 with servo channel 604 such that second servo signal 650 is properly aligned with first servo signal 645 as shown in FIG. 6C, rather than being misaligned by prior art methods with first servo signal 635 as shown in FIG. 6B. Thereafter, second servo signal 660 is properly aligned with first servo signal 655 as shown in FIG. 6C, rather than being misaligned by prior art methods with first servo signal 645 as shown in FIG. 6B

Because Applicants' method properly aligns servo channels 603 and 604 even though servo channel 604 completely misses servo pattern 630, Applicants' method decodes a correct LPOS word. Referring to FIGS. 6A, 6B, 7A and 7B, by shifting the servo signals in second servo channel 604 for LPOS bit indices (i+3), (i+4), and (i+5), Applicants' method syncs the second servo channel 604 with first servo channel 603. As a result, Applicants' method decodes LPOS word 780 which correctly comprises LPOS bits 010101.

Figure 10B:
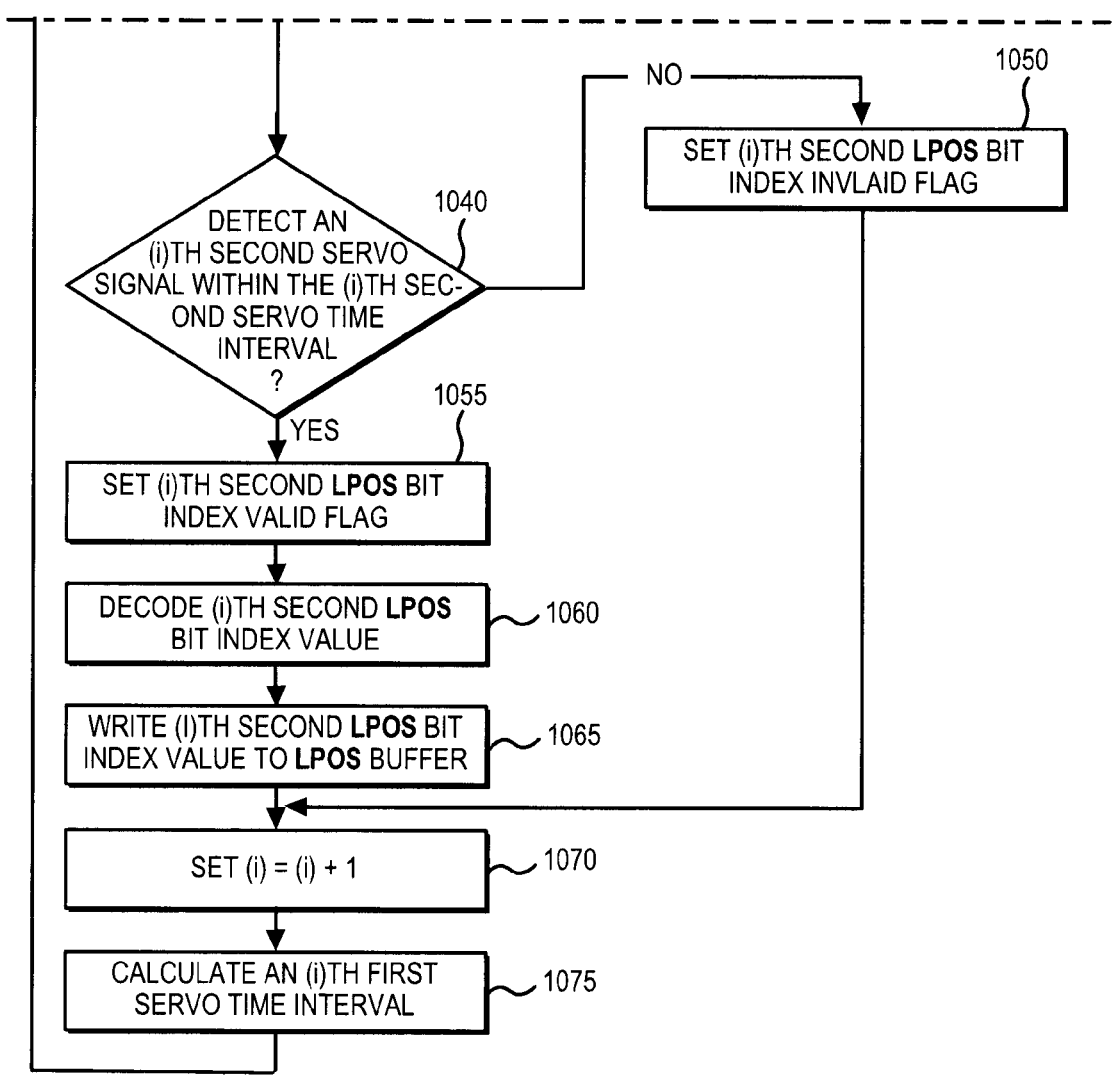
FIG. 10B summarizes certain additional steps of Applicants' method to decode LPOS information encoded in a sequential information storage medium.

In certain embodiments, step 920 of FIG. 9 comprises steps 1010 through 1075 recited in FIGS. 10A and 10B. Referring now to FIG. 10A, in step 1005 the method provides a sequential information storage medium, such as a magnetic tape, encoded with at least two servo bands, wherein each servo band comprises a plurality of sequential servo patterns, wherein each servo pattern encodes a bit of LPOS information. Step 910 further comprises supplying a drive apparatus, such as a tape drive apparatus, comprising a first servo channel comprising a first servo sensor, a second servo channel comprising a second servo sensor, an LPOS controller, and an LPOS buffer.

In step 1010, the method sets a first servo channel as a primary servo channel. In certain embodiments, step 1010 is performed by Applicants' LPOS controller. In certain embodiments, step 1010 is performed by a tape drive assembly.

In step 1015, the method determines if an (i)th first servo signal was detected on the first servo channel within a calculated time interval, i.e. a "window." For example and referring now to FIGS. 4A and 10, in the illustrated embodiment of FIG. 4A the method detects an (i)th servo pattern, namely servo pattern 410, at time $T_0$ on servo channel 1. In certain embodiments, step 1015 is performed by Applicants' LPOS controller. In certain embodiments, step 1015 is performed by a tape drive assembly.

If the method determines in step 1015 that an (i)th first LPOS servo signal was detected on the first servo channel, then the method transitions from step 1015 to step 1020 wherein the method sets an (i)th first LPOS bit index valid flag in an LPOS buffer, such as LPOS buffer 824 (FIG. 8). In certain embodiments, step 1015 is performed by Applicants' LPOS controller. In certain embodiments, step 1015 is performed by a tape drive assembly.

In step 1025, the method decodes the (i)th first LPOS bit index value. In certain embodiments, step 1025 is performed by Applicants' LPOS controller. In certain embodiments, step 1025 is performed by a tape drive assembly.

In step 1030, the method writes the first LPOS bit index value to a LPOS buffer. In certain embodiments, step 1030 is performed by Applicants' LPOS controller. In certain embodiments, step 1030 is performed by a tape drive assembly.

In step 1035, the method calculates an (i)th second servo time interval. In certain embodiments, step 1035 is performed by Applicants' LPOS controller. For example, and referring now to FIGS. 4B and 10, in step 1035 the method, based upon the physical positioning of servo signals in a first servo band and a second servo band, i.e. a physical offset, and based upon the speed that the sequential information storage medium is moving, the method calculates a time window during which an (i)th second LPOS servo signal should be detected in a second servo channel. In the illustrated embodiment of FIG. 4B, based upon time $T_0$ (FIG. 4A), and based upon the physical offset of servo signals in a first servo band and a second servo band, and based upon the speed of a magnetic tape comprising those servo bands, the method calculates time interval 420 which is defined by times $T_1$ and $T_2$. In certain embodiments, step 1035 is performed by a tape drive assembly.

As noted herein above, the calculated time interval of step 1035 is based upon, inter alia, the physical offset of servo signals encoded to two different servo bands. For example referring once again to FIG. 5A, as described hereinabove servo signals 505 and 510 comprise an (i)th grouping of servo signals, wherein servo signal 505 encodes the same bit as does servo signal 510. As shown in FIG. 5A, servo signals 505 and 510 are offset physically from one another along the length of tape 500.

The distance between corresponding servo signals varies with tape format. In certain tape formats, there is no physical offset. In these embodiments, an (i)th first LPOS servo signal should be detected in a first servo channel at the same time that an (i)th second LPOS servo signal should be detected in a second servo channel. In certain embodiments of Applicants' method, a virtual offset value is established and applied to one servo band thereby creating a virtual offset between servo signals encoded in a first servo band and each corresponding servo signal encoded in a second servo band. In these virtual offset embodiments, step 1035 further comprises setting a second servo channel offset value, and using that second servo channel offset value to calculate an (i)th second servo time interval.

In step 1040, the method determines if an (i)th second LPOS servo signal was detected within the (i)th second servo time interval of step 1035. For example and referring now to FIGS. 4C and 10, in the illustrated embodiment of FIG. 4C servo signal 430 is detected within time interval 420 (FIG. 4B) which is defined by times $T_1$ and $T_2$. In certain embodiments, step 1040 is performed by Applicants' LPOS controller. In certain embodiments, step 1040 is performed by a tape drive assembly.

If the method determines that an (i)th second LPOS servo signal was detected within the (i)th second servo time interval of step 1035, then the method transitions from step 1040 to step 1055 wherein the method sets an (i)th second LPOS bit index valid flag in an LPOS buffer, such as LPOS buffer 824 (FIG. 8). In certain embodiments, step 1055 is performed by Applicants' LPOS controller. In certain embodiments, step 1055 is performed by a tape drive assembly.

In step 1060, the method decodes the (i)th second LPOS bit index value. In certain embodiments, step 1060 is performed by Applicants' LPOS controller. In certain embodiments, step 1060 is performed by a tape drive assembly.

In step 1065, the method writes the second LPOS bit index value to a LPOS buffer. In certain embodiments, step 1065 is performed by Applicants' LPOS controller. In certain embodiments, step 1065 is performed by a tape drive assembly. The method transitions from step 1065 to step 1070.

If Applicants' method determines in step 1040 that an (i)th second servo signal was not detected within the (i)th second servo time interval of step 1035, then the method transitions from step 1040 to step 1050 wherein the method sets an (i)th second LPOS bit index invalid flag in the LPOS buffer. In certain embodiments, step 1050 is performed by Applicants' LPOS controller. In certain embodiments, step 1050 is performed by a tape drive assembly.

The method transitions from step 1050 to 1070 wherein the method sets (i) equal to (i)+1. In certain embodiments, step 1070 is performed by Applicants' LPOS controller. In certain embodiments, step 1070 is performed by a tape drive assembly.

If Applicants' method determines in step 1040 that an (i)th second servo signal was not detected within the (i)th second servo time interval of step 1035, then the method transitions from step 1040 to step 1050 wherein the method sets an (i)th second LPOS bit index invalid flag in the LPOS buffer. In certain embodiments, step 1050 is performed by Applicants' LPOS controller. In certain embodiments, step 1050 is performed by a tape drive assembly. The method transitions from step 1050 to 1070 and continues as described herein.

In step 1075, the method calculates an (i+1)th first servo channel time interval. For example and referring now to FIGS. 4D and 10, based upon time interval 420 (FIG. 4B), the method calculates time interval 440 defined by time $T_3$ and $T_4$, wherein an (i+1)th first LPOS servo signal should be detected during that time interval 440. The method in step 1075 calculates an (i+1)th first servo time interval even if an (i)th second servo signal was not detected in step 1040. For example and referring now to FIG. 4E, even if Applicants' method fails to detect in step 1040 an (i)th second servo pattern within time interval 420, the method nevertheless in step 1075 calculates time interval 440, wherein an (i+1)th first servo signal should be detected in a first servo channel within interval 440.

In certain embodiments, step 1075 further comprises establishing a first channel offset value, wherein the method in step 1075 calculates an (i+1)th first servo channel time interval using that first channel offset value. In certain embodiments, step 1075 is performed by Applicants' LPOS controller. In certain embodiments, step 1075 is performed by a tape drive assembly. Applicants' method transitions from step 1075 to step 1015 and continues as described herein.

Referring now to FIGS. 9 and 10, in certain embodiments step 930 recited in FIG. 9 further comprises step 1080 recited in FIG. 10A. If Applicants' method does not detect in step 1015 an (i)th first servo signal on the first servo channel within a calculated time interval, then the method transitions from step 1015 to step 1080 wherein the method sets an (i)th first LPOS bit index invalid flag in the LPOS buffer. In certain embodiments, step 1080 is performed by Applicants' LPOS controller. In certain embodiments, step 1080 is performed by a tape drive assembly.

In certain embodiments, step 940 recited in FIG. 9 comprises step 1085 recited in FIG. 10A. In step 1085, the method determines the number (n) of second LPOS bit index invalid flags that are set. In certain embodiments, step 1085 is performed by Applicants' LPOS controller. In certain embodiments, step 1085 is performed by a tape drive assembly. The number (n) of second LPOS bit index invalid flags of step 1085 corresponds to the number of undetected second servo signals of step 940.

In step 1090, Applicants' method syncs the second servo channel with the first servo channel using the value of (n) determined in step 1085. In certain embodiments, step 1090 is performed by Applicants' LPOS controller. In certain embodiments, step 1090 is performed by a tape drive assembly. Step 1090 of FIG. 10A is the same as step 940 of FIG. 9.

In step 1095, the method utilizes the second servo channel as the primary servo channel. In certain embodiments, step 1095 is performed by Applicants' LPOS controller. In certain embodiments, step 1095 is performed by a tape drive assembly.

Applicants' invention further comprises an article of manufacture, such as and without limitation a tape drive apparatus, and/or Applicants' LPOS controller, and/or an automated data storage library, and/or a host computing device comprising a storage management program and in communication with a data storage library, wherein that article of manufacture comprises a computer readable medium, such as computer readable medium 830, comprising computer readable program code comprising a series of computer readable program steps to effect one or more of steps 920, 930, 940, 950, and/or 960, recited in FIG. 9, and/or one or more of steps 1010, 1015, 1020, 1025, 1030, 1035, 1040, 1050, 1055, 1060, 1065, 1070, 1075, 1080, 1085, 1090, and/or 1095, recited in FIGS. 10A and 10B.

Applicants' invention further includes a computer program product encoded in a computer readable medium and usable with a computer processor to implement one or more of steps 920, 930, 940, 950, and/or 960, recited in FIG. 9, and/or one or more of steps 1010, 1015, 1020, 1025, 1030, 1035, 1040, 1050, 1055, 1060, 1065, 1070, 1075, 1080, 1085, 1090, and/or 1095, recited in FIGS. 10A and 10B.

In either case, Applicants' computer readable code and/or computer program product is encoded in a computer readable medium comprising, for example and without limitation, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to decode linear position ("LPOS") information encoded in a sequential information storage medium, comprising the steps of:

detecting a plurality of sequential first LPOS servo patterns encoded in a first servo band using a first servo sensor in communication with a first servo channel;

detecting a plurality of sequential first LPOS servo patterns encoded in a second servo band using a second servo sensor in communication with a second servo channel;

when a data bit is detected in said first servo band, and a corresponding data bit is detected in said second servo band, pairing said data bit detected in said first servo band with said corresponding data bit detected in said second servo band and adding either said data bit detected in said first servo band or said corresponding data bit detected in said second servo band, to an LPOS word;

when a data bit is detected in said first servo band, but a corresponding data bit is not detected in said second servo band, adding said data bit detected in said first servo band to said LPOS word;

detecting an (i)th first servo signal encoded in said first servo band, wherein said (i)th servo signal encodes a value for an (i)th LPOS bit index, wherein (i) is greater than or equal to 1;

setting an (i)th first LPOS bit index valid flag;

calculating an (i)th second servo time interval;

determining if an (i)th second servo signal encoded in said second servo band was detected within said (i)th second servo time interval;

operative if an (i)th second servo channel signal was not detected within said second servo time interval, setting an (i)th second LPOS bit index invalid flag.

2. The method of claim 1, further comprising the steps of:
    establishing a second channel timing offset value;
    wherein said calculating an (i)th second servo time interval comprises calculating an (i)th second servo time interval using said second channel timing offset value.

3. The method of claim 1, further comprising the steps of:
    decoding an (i)th first LPOS bit index value;
    writing said (i)th first LPOS bit index value to an LPOS buffer.

4. The method of claim 1, further comprising the steps of:
operative if an (i)th second servo channel signal was detected within said second servo time interval;
setting an (i)th second LPOS bit index valid flag;
decoding an (i)th second LPOS bit index value;
writing said (i)th second LPOS bit index value to an LPOS buffer.

5. The method of claim 1, further comprising the steps of:
calculating an (i+1)th first servo time interval;
determining if an (i+1)th first servo signal encoded in said first servo band was detected within said (i+1)th first servo time interval;
operative if an (i+1)th first servo signal was not detected within said (i+1)th first servo time interval, setting an (i+1)th first LPOS bit index invalid flag.

6. The method of claim 5, further comprising the steps of:
establishing a first channel timing offset value;
wherein said calculating an (i+1)th first servo time interval comprises calculating an (i+1)th first servo time interval using said first channel timing offset value.

7. The method of claim 6, further comprising the steps of:
operative if an (i+1)th first servo signal was detected within said (i+1)th first servo time interval;
setting an (i+1)th first LPOS bit index valid flag;
decoding an (i+1)th first LPOS bit index value;
writing said (i+1)th first LPOS bit index value to an LPOS buffer.

8. The method of claim 7, further comprising the steps of:
providing an LPOS controller, wherein said LPOS controller comprises said LPOS buffer;
wherein said LPOS controller performs said syncing step;
wherein said LPOS controller performs said writing steps;
wherein said LPOS controller performs said setting steps.

9. An article of manufacture comprising a computer readable medium comprising computer readable program code disposed therein to decode linear position ("LPOS") information encoded in a sequential information storage medium, the computer readable program code comprising a series of computer readable program steps to effect:
detecting a plurality of sequential first LPOS servo patterns encoded in a first servo band using a first servo sensor in communication with a first servo channel;
detecting a plurality of sequential first LPOS servo patterns encoded in a second servo band using a second servo sensor in communication with a second servo channel;
when a data bit is detected in said first servo band, and a corresponding data bit is detected in said second servo band, pairing said data bit detected in said first servo band with said corresponding data bit detected in said second servo band and adding either said data bit detected in said first servo band or said corresponding data bit detected in said second servo band, to an LPOS word;
when a data bit is detected in said first servo band, but a corresponding data bit is not detected in said second servo band, adding said data bit detected in said first servo band to said LPOS word;
detecting an (i)th first servo signal encoded in said first servo band, wherein said (i)th servo signal encodes a value for an (i)th LPOS bit index, wherein (i) is greater than or equal to 1;
setting an (i)th first LPOS bit index valid flag;
calculating an (i)th second servo time interval;
determining if an (i)th second servo signal encoded in said second servo band was detected within said (i)th second servo time interval;
operative if an (i)th second servo channel signal was not detected within said second servo time interval, setting an (i)th second LPOS bit index invalid flag.

10. The article of manufacture of claim 9, said computer readable program code further comprising a series of computer readable program steps to effect:
establishing a second channel timing offset value;
wherein said calculating an (i)th second servo time interval comprises calculating an (i)th second servo time interval using said second channel timing offset value.

11. The article of manufacture of claim 9, said computer readable program code further comprising a series of computer readable program steps to effect:
decoding an (i)th first LPOS bit index value;
writing said (i)th first LPOS bit index value to an LPOS buffer.

12. The article of manufacture of claim 9, said computer readable program code further comprising a series of computer readable program steps to effect:
operative if an (i)th second servo channel signal was detected within said second servo time interval;
setting an (i)th second LPOS bit index valid flag;
decoding an (i)th second LPOS bit index value;
writing said (i)th second LPOS bit index value to an LPOS buffer.

13. The article of manufacture of claim 12, said computer readable program code further comprising a series of computer readable program steps to effect:
calculating an (i+1)th first servo time interval;
determining if an (i+1)th first servo signal encoded in said first servo band was detected within said (i+1)th first servo time interval;
operative if an (i+1)th first servo signal was not detected within said (i+1)th first servo time interval, setting an (i+1)th first LPOS bit index invalid flag.

14. The article of manufacture of claim 13, said computer readable program code further comprising a series of computer readable program steps to effect:
establishing a first channel timing offset value;
wherein said calculating an (i+1)th first servo time interval comprises calculating an (i+1)th first servo time interval using said first channel timing offset value.

15. The article of manufacture of claim 13, said computer readable program code further comprising a series of computer readable program steps to effect:
operative if an (i+1)th first servo signal was detected within said (i+1)th first servo time interval;
setting an (i+1)th first LPOS bit index valid flag;
decoding an (i+1)th first LPOS bit index value;
writing said (i+1)th first LPOS bit index value to an LPOS buffer.

16. The article of manufacture of claim 9, wherein;
said article of manufacture comprises an LPOS controller, a first servo sensor, a second servo sensor, a first servo channel, and a second servo channel;
said first servo channel interconnects said first servo sensor and said LPOS controller; and
said second servo channel interconnects said second servo sensor and said LPOS controller.

17. The article of manufacture of claim 16, wherein:
said article of manufacture comprises a magnetic tape drive apparatus;
said magnetic tape drive apparatus comprises an LPOS controller, a first servo sensor, a second servo sensor, a first servo channel, and a second servo channel;
said first servo channel interconnects said first servo sensor and said LPOS controller; and said second servo channel interconnects said second servo sensor and said LPOS controller.

18. A computer program product encoded in an information storage medium wherein said computer program product is usable with a programmable computer processor to decode linear position ("LPOS") information encoded in a sequential information storage medium, comprising:

computer readable program code which causes said programmable computer processor to detect a plurality of sequential first LPOS servo patterns encoded in a first servo band using a first servo sensor in communication with a first servo channel;

computer readable program code which causes said programmable computer processor to detect a plurality of sequential first LPOS servo patterns encoded in a second servo band using a second servo sensor in communication with a second servo channel;

computer readable program code which, when a data bit is detected in said first servo band, and a corresponding data bit is detected in said second servo band, causes said programmable computer processor to pair said data bit detected in said first servo band with said corresponding data bit detected in said second servo band and add either said data bit detected in said first servo band or said corresponding data bit detected in said second servo band, to an LPOS word;

computer readable program code which, when a data bit is detected in said first servo band, but a corresponding data bit is not detected in said second servo band, causes said programmable computer processor to add said data bit detected in said first servo band to said LPOS word, computer readable program code which causes said programmable computer processor to detect an (i)th first servo signal encoded in a first servo band, wherein said (i)th servo signal encodes a value for an (i)th LPOS bit index, wherein (i) is greater than or equal to 1;

computer readable program code which causes said programmable computer processor to set an (i)th first LPOS bit index valid flag;

computer readable program code which causes said programmable computer processor to calculate an (i)th second servo time interval;

computer readable program code which causes said programmable computer processor to determine if an (i)th second servo signal encoded in said second servo band was detected within said (i)th second servo time interval;

computer readable program code which, if an (i)th second servo channel signal was not detected within said second servo time interval, causes said programmable computer processor to set an (i)th second LPOS bit index invalid flag.

19. The computer program product of claim 18, further comprising:

computer readable program code which causes said programmable computer processor to decode an (i)th first LPOS bit index value;

computer readable program code which causes said programmable computer processor to write said (i)th first LPOS bit index value to an LPOS buffer.

20. The computer program product of claim 19, further comprising:

computer readable program code which, if an (i)th second servo channel signal was detected within said second servo time interval, causes said programmable computer processor to;

set an (i)th second LPOS bit index valid flag;

decode an (i)th second LPOS bit index value;

write said (i)th second LPOS bit index value to an LPOS buffer.

21. The computer program product of claim 20, further comprising:

computer readable program code which causes said programmable computer processor to calculate an (i+1)th first servo time interval;

computer readable program code which causes said programmable computer processor to determine if an (i+1)th first servo signal encoded in said first servo band was detected within said (i+1)th first servo time interval;

computer readable program code which, if an (i+1)th first servo signal was not detected within said (i+1)th first servo time interval, causes said programmable computer processor to set an (i+1)th first LPOS bit index invalid flag.

22. The computer program product of claim 21, further comprising the steps of:

computer readable program code which, if an (i+1)th first servo signal was detected within said (i+1)th first servo time interval causes said programmable computer processor to:

set an (i+1)th first LPOS bit index valid flag;

decode an (i+1)th first LPOS bit index value;

write said (i+1)th first LPOS bit index value to an LPOS buffer.

* * * * *